United States Patent
Freytag et al.

(10) Patent No.: US 7,878,156 B2
(45) Date of Patent: *Feb. 1, 2011

(54) METHOD AND PLANT FOR THE CONVEYANCE OF FINE-GRAINED SOLIDS

(75) Inventors: Jochen Freytag, Usingen (DE); Martin Hirsch, Friedrichsdorf (DE); Michael Ströder, Neu-Anspach (DE)

(73) Assignee: Outotec Oyj, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 10/540,438

(22) PCT Filed: Dec. 12, 2003

(86) PCT No.: PCT/EP03/14105

§ 371 (c)(1),
(2), (4) Date: Jun. 6, 2006

(87) PCT Pub. No.: WO2004/056462

PCT Pub. Date: Jul. 8, 2004

(65) Prior Publication Data

US 2006/0249100 A1    Nov. 9, 2006

(30) Foreign Application Priority Data

Dec. 23, 2002  (DE) ................. 102 60 738

(51) Int. Cl.
*F23C 10/04* (2006.01)
*B01J 8/24* (2006.01)
*C22B 1/10* (2006.01)

(52) U.S. Cl. .................... 122/4 D; 432/16; 432/58; 75/444; 148/630; 266/172

(58) Field of Classification Search ............ 432/14–16, 432/58, 27; 122/4 D; 110/345, 245; 75/444; 148/630; 266/172

See application file for complete search history.

(56) References Cited

U.S. PATENT DOCUMENTS

| | | | |
|---|---|---|---|
| 2,485,317 A | 1/1943 | Roetheli | |
| 2,582,710 A | 1/1952 | Martin | |
| 2,607,666 A | 8/1952 | Martin | |
| 2,714,126 A | 7/1955 | Keith | |
| 2,826,460 A | 3/1958 | Cameron et al. | 302/52 |
| 2,864,674 A | 12/1958 | King | |
| 2,874,095 A | 2/1959 | Boisture et al. | |
| 2,901,421 A | 8/1959 | Bourget et al. | 208/174 |
| 3,528,179 A | 9/1970 | Smith | |
| 3,565,408 A | 2/1971 | Reh et al. | |
| 3,578,798 A | 5/1971 | Lapple et al. | |

(Continued)

FOREIGN PATENT DOCUMENTS

AU    9894057    5/2000

(Continued)

OTHER PUBLICATIONS

English abstract of German application No. 41 03 965.

(Continued)

*Primary Examiner*—Gregory A Wilson
(74) *Attorney, Agent, or Firm*—Leydig, Voit & Mayer, Ltd.

(57) ABSTRACT

The present invention relates to a method for the conveyance of fine-grained solids in a fluidized bed reactor and also to a corresponding plant. It is proposed to introduce a first gas or gas mixture from below through a central tube (3) into a mixing chamber (7) of the reactor (1), the central tube (3) being at least partly surrounded by a stationary annular fluidized bed (10) which is fluidized by supplying fluidizing gas. The gas velocities of the first gas or gas mixture as well as of the fluidizing gas for the annular fluidized bed (10) are adjusted such that the particle Froude numbers in the central tube (3) are between 1 and 100, in the annular fluidizied bed (10) between 0.02 and 2 in the mixing chamber (7) between 0.3 and 30.

22 Claims, 1 Drawing Sheet

U.S. PATENT DOCUMENTS

| | | |
|---|---|---|
| 3,671,424 A | 6/1972 | Saxton |
| 3,876,392 A | 4/1975 | Kalina et al. |
| 3,884,620 A | 5/1975 | Rammler |
| 3,995,987 A | 12/1976 | MacAskill |
| 4,044,094 A | 8/1977 | Barner et al. |
| 4,073,642 A | 2/1978 | Collin et al. |
| 4,080,437 A * | 3/1978 | Reh et al. .................. 423/625 |
| 4,091,085 A | 5/1978 | Reh et al. |
| 4,147,911 A | 4/1979 | Nishitani et al. |
| 4,191,544 A | 3/1980 | Boll et al. |
| 4,307,277 A | 12/1981 | Maeda et al. |
| 4,338,283 A | 7/1982 | Sakamoto et al. |
| 4,377,466 A | 3/1983 | Wallman |
| 4,402,754 A * | 9/1983 | Schmidt et al. ............. 106/744 |
| 4,404,755 A | 9/1983 | Stewart et al. |
| 4,490,287 A | 12/1984 | Hardwick et al. |
| 4,539,188 A | 9/1985 | Hirsch et al. |
| 4,545,132 A | 10/1985 | Li et al. |
| 4,555,388 A | 11/1985 | Hundebol |
| 4,676,824 A | 6/1987 | Daradimos et al. |
| 4,716,856 A | 1/1988 | Beisswenger et al. ....... 122/4 D |
| 4,786,477 A | 11/1988 | Yoon et al. |
| 4,789,580 A | 12/1988 | Hirsch et al. |
| 4,795,547 A | 1/1989 | Barnes |
| 4,806,158 A | 2/1989 | Hirsch et al. |
| 4,817,563 A * | 4/1989 | Beisswenger et al. ....... 122/4 D |
| 4,822,592 A | 4/1989 | Misra |
| 4,919,715 A | 4/1990 | Smith et al. |
| 4,992,245 A | 2/1991 | Van Slooten et al. |
| 5,033,413 A | 7/1991 | Zenz et al. .................. 122/4 D |
| 5,084,140 A | 1/1992 | Holland et al. |
| 5,204,115 A | 4/1993 | Olinger et al. |
| 5,205,350 A * | 4/1993 | Hirsch et al. ........... 165/104.18 |
| 5,269,236 A | 12/1993 | Okuno et al. |
| 5,349,154 A | 9/1994 | Harker et al. |
| 5,374,413 A | 12/1994 | Kim et al. |
| 5,382,412 A | 1/1995 | Kim et al. |
| 5,382,418 A | 1/1995 | Thone et al. |
| 5,437,850 A | 8/1995 | Kroehl et al. |
| 5,505,907 A * | 4/1996 | Hiltunen et al. ............. 422/146 |
| 5,527,379 A | 6/1996 | Hirsch et al. |
| 5,560,762 A | 10/1996 | Bresser et al. |
| 5,573,689 A | 11/1996 | Fukuoka et al. |
| 5,603,748 A | 2/1997 | Hirsch et al. |
| 5,783,158 A | 7/1998 | Tacke et al. |
| 5,942,110 A | 8/1999 | Norris |
| 6,007,869 A | 12/1999 | Schreieder et al. |
| 6,015,539 A | 1/2000 | Schmidt et al. |
| 6,022,513 A | 2/2000 | Pecoraro et al. |
| 6,074,533 A | 6/2000 | Tranquilla |
| 6,110,413 A | 8/2000 | Jung et al. |
| 6,197,234 B1 | 3/2001 | Goudmand et al. |
| 6,368,389 B1 | 4/2002 | Birke et al. |
| 6,395,248 B1 | 5/2002 | Kim et al. |
| 6,413,477 B1 | 7/2002 | Govoni et al. |
| 6,416,721 B1 | 7/2002 | Sanjurjo et al. |
| 6,827,786 B2 | 12/2004 | Lord |
| 6,830,597 B1 | 12/2004 | Green |
| 2002/0113024 A1 | 8/2002 | Pilz et al. |
| 2004/0042952 A1 | 3/2004 | Bergeron et al. |
| 2006/0162500 A1 | 7/2006 | Nuber et al. |
| 2006/0230879 A1 | 10/2006 | Stroder et al. |
| 2006/0230880 A1 | 10/2006 | Hirsch et al. |
| 2006/0231433 A1 | 10/2006 | Rufo et al. |
| 2006/0231466 A1 | 10/2006 | Nuber |
| 2006/0237300 A1 | 10/2006 | Stroder et al. |
| 2006/0249100 A1 | 11/2006 | Freytag et al. |
| 2006/0263292 A1 | 11/2006 | Hirsch et al. |
| 2006/0278566 A1 | 12/2006 | Orth et al. |
| 2007/0137435 A1 | 6/2007 | Orth et al. |
| 2008/0124253 A1 | 5/2008 | Schmidt et al. |

FOREIGN PATENT DOCUMENTS

| | | |
|---|---|---|
| CN | 1424280 | 6/2003 |
| CN | 1732276 | 2/2006 |
| CN | 1738918 | 2/2006 |
| DE | 575245 | 4/1933 |
| DE | 1016938 | 10/1957 |
| DE | 2524541 | 12/1976 |
| DE | 2636134 | 2/1977 |
| DE | 2805906 | 8/1979 |
| DE | 3235559 | 5/1984 |
| DE | 2624302 | 4/1987 |
| DE | 248109 | 7/1987 |
| DE | 3822999 | 1/1990 |
| DE | 278348 | 5/1990 |
| DE | 4015031 | 11/1991 |
| DE | 41 03 965 | 4/1992 |
| DE | 4206602 | 6/1993 |
| DE | 4410093 | 3/1995 |
| DE | 19609284 | 9/1997 |
| DE | 19841513 | 5/1999 |
| DE | 19813286 | 9/1999 |
| DE | 69416458 | 9/1999 |
| DE | 69417103 | 9/1999 |
| DE | 10101157 | 7/2002 |
| DE | 10061386 | 9/2002 |
| DE | 10164086 | 8/2003 |
| DE | 10260743 | 7/2004 |
| EP | 246191 | 11/1987 |
| EP | 534243 | 3/1993 |
| EP | 0 630 683 A1 | 12/1994 |
| EP | 630975 | 12/1994 |
| EP | 748391 | 12/1996 |
| EP | 995065 | 4/2000 |
| GB | 827627 | 2/1960 |
| GB | 915412 | 1/1963 |
| GB | 951245 | 3/1964 |
| GB | 1316849 | 5/1973 |
| GB | 1502576 | 3/1978 |
| JP | 57209635 A | 12/1982 |
| JP | 59197724 A | 11/1984 |
| JP | 63223001 A | 9/1988 |
| JP | 1294794 A | 11/1989 |
| WO | WO-8909290 | 10/1989 |
| WO | WO-9011824 | 10/1990 |
| WO | WO-9808989 | 3/1998 |
| WO | WO-0144719 | 6/2001 |
| WO | WO-2055744 | 7/2002 |
| WO | WO-4056465 | 7/2004 |
| WO | WO-4056467 | 7/2004 |

OTHER PUBLICATIONS

English abstract of German application No. 2624302.
U.S. Appl. No. 10/540,436, filed Nov. 10, 2005, Dirk Nuber et al.
U.S. Appl. No. 10/540,376, filed Jan. 17, 2006, Dirk Nuber et al.
U.S. Appl. No. 10/540,437, filed May 10, 2006, Michael Stroder et al.
U.S. Appl. No. 10/540,434, filed May 16, 2006, Martin Hirsch et al.
U.S. Appl. No. 10/540,435, filed Mar. 27, 2006, Andreas Orth et al.
U.S. Appl. No. 10/540,073, filed Jul. 19, 2006, Andreas Orth et al.
U.S. Appl. No. 10/540,355, filed Mar. 24, 2006, Michael Stroder et al.
U.S. Appl. No. 10/540,497, filed May 31, 2006, Michael Stroder et al.
U.S. Appl. No. 10/540,352, filed Mar. 21, 2006, Michael Stroder et al.
U.S. Appl. No. 10/540,071, filed May 11, 2006, Martin Hirsch et al.
English abstract of German application No. 41 03 965, Feb. 9, 1991.
English abstract of German application No. 2624302, May 31, 1976.
State Intellectual Property Office Of The P.R. China Examination Report for Application No. GCC/P/2004/3442 (7 pages); report completed on Mar. 12, 2008.
Japanese Office Action dated Dec. 1, 2009; JP 2004-561280.
"Ullmann's Encyclopedia of Industrial Chemistry" 5th edition, 1994, vol. A25, pp. 574-575.

Sander U H F et al. "Production from elemental sulphur" Sulphur, Sulphur Dioxide and Sulphuric Acid. Introduction to their Industrial Chemistry and Technology, London, British Sulphur Corporation, GB, 1984, pp. 168-176, XP0006085.

Barbara Elvers et al. "Ullmann's Encyclopedia of Industrial Chemistry", Fifth, Completely Revised Edition, vol. A25, VCH, pp. 567-577.

Notice of Allowance dated Feb. 6, 2009 for U.S. Appl. No. 10/540,355 filed Feb. 2, 2006.

Vijay, "Preoxidation and Hydrogen Reduction of Ilmenite in a Fluidized Bed Reactor" XP 000632260, Metallurgical and Material Transactions B, vol. 27B, Oct. 1996, 9. 731-738.

Kim, Y.T. et al, "Entrainment of solids in an internally circulating fluidized bed with draft tube". Chemical Engineering Journal, vol. 66, (1997), p. 105-110.

Notice of Allowance dated Jul. 20, 2009 for U.S. Appl. No. 10/540,435 filed Mar. 27, 2006.

Office Action dated Sep. 19, 2008 for U.S. Appl. No. 10/540,435 filed Mar. 27, 2006.

Office Action dated Feb. 11, 2009 for U.S. Appl. No. 10/540,497 filed May 31, 2006.

Notice of Allowance dated Feb. 6, 2009 for U.S. Appl. No. 10/540,355 filed Feb. 2, 2006.

Office Action dated Aug. 12, 2008 for U.S. Appl. No. 10/540,355 filed Feb. 2, 2006.

Office Action dated Mar. 27, 2008 for U.S. Appl. No. 10/540,355 filed Feb. 2, 2006.

Office Action dated Jul. 08, 2009 for U.S. Appl. No. 10/540,073 filed Jul. 19, 2006.

Office Action dated Jan. 26, 2009 for U.S. Appl. No. 10/540,073 filed Jul. 19, 2006.

Office Action dated Aug. 21, 2008 for U.S. Appl. No. 10/540,073 filed Jul. 19, 2006.

Office Action dated May 13, 2009 for U.S. Appl. No. 10/540,376 filed Jan. 17, 2006.

Office Action dated Oct. 9, 2008 for U.S. Appl. No. 10/540,376 filed Jan. 17, 2006.

Office Action dated Jun. 2, 2008 for U.S. Appl. No. 10/540,376 filed Jan. 17, 2006.

Office Action dated Sep. 17, 2008 for U.S. Appl. No. 10/540,434 filed May 16, 2006.

Notice of Allowance dated Dec. 3, 2008 for U.S. Appl. No. 10/540,437 filed May 10, 2006.

Office Action dated Jun. 16, 2008 for U.S. Appl. No. 10/540,437 filed May 10, 2006.

Office Action dated Dec. 29, 2008 for U.S. Appl. No. 10/540,071 filed May 11, 2006.

Office Action dated Jul. 23, 2008 for U.S. Appl. No. 10/540,071 filed May 11, 2006.

Notice of Allowance dated Apr. 13, 2009 for U.S. Appl. No. 10/540,071 filed May 11, 2006.

Office Action dated Jul. 14, 2008 for U.S. Appl. No. 10/540,436 filed Nov. 10, 2005.

Office Action dated Oct. 30, 2008 for U.S. Appl. No. 10/540,436 filed Nov. 10, 2005.

Office Action dated Apr. 17, 2009 for U.S. Appl. No. 10/540,436 filed Nov. 10, 2005.

Office Action dated Dec. 27, 2007 for U.S. Appl. No. 10/540,436 filed Nov. 10, 2005.

* cited by examiner

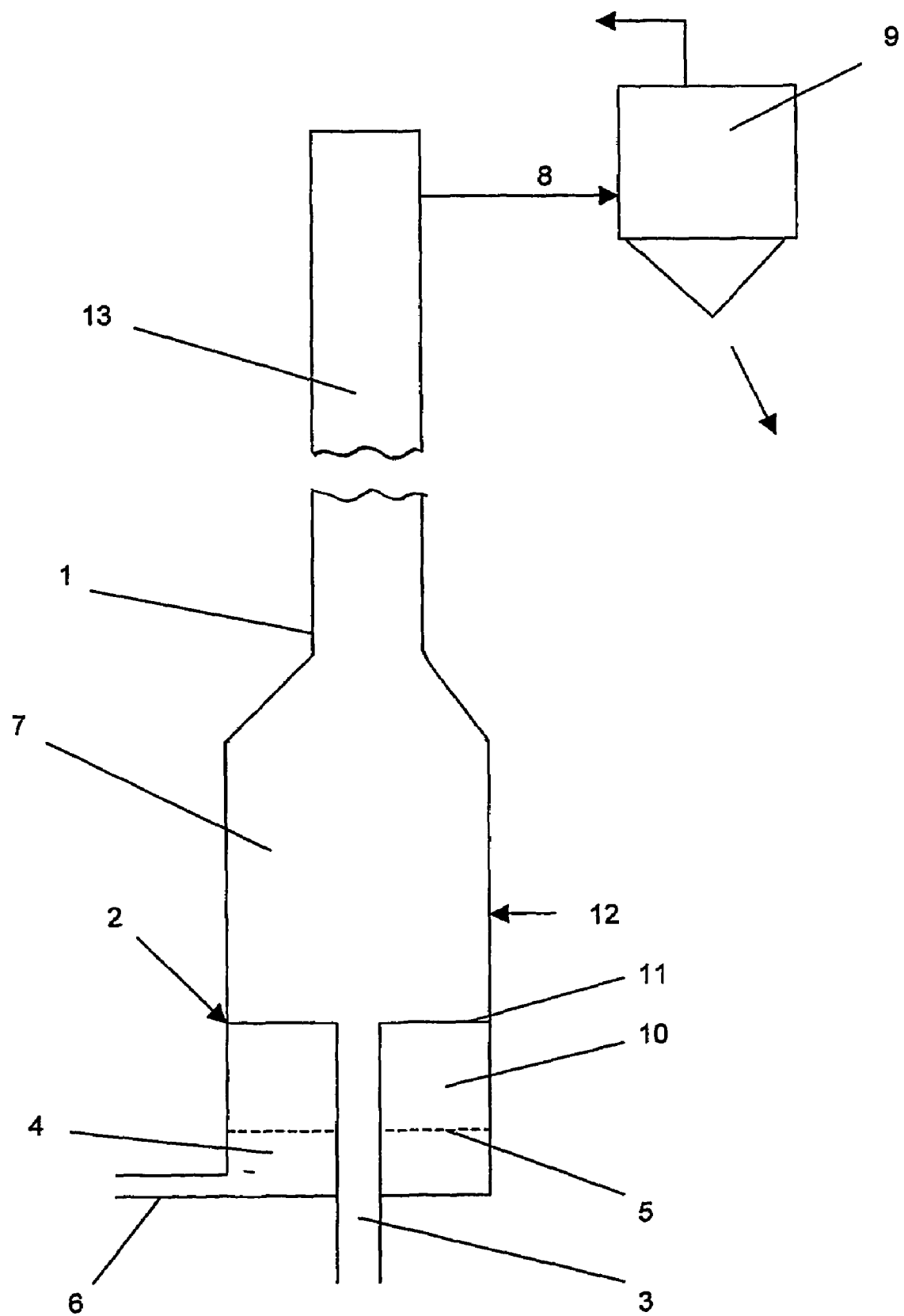

METHOD AND PLANT FOR THE CONVEYANCE OF FINE-GRAINED SOLIDS

TECHNICAL FIELD

This application is the national phase application under 35 U.S.C. 371 of International Application No. PCT/EP2003/014105 filed on Dec. 12, 2003, entitled, "Method and Plant for the Conveyance of Fine-Grained Solids" which claims the benefit of German Patent Application No. 102 60 738.9, filed on Dec. 23, 2002.

The present invention relates to a method for the conveyance of fine-grained solids in a fluidized bed reactor and also to a corresponding plant.

Such methods and plants are used in various application areas for different gas-solid combinations. For example, iron ores reduced for the production of sponge-iron briquettes must be conveyed to a height of approximately 50 m in order to allow them to be supplied and distributed to various briquetting presses. Also for the direct reduction of iron ores or in the gas reduction of ores containing titanium, gravity is used for supplying the heated starting materials to the reactors for processing. For this purpose, they must first be conveyed to a considerable height.

The transport of fine-grained solids usually takes place pneumatically, i.e. the solids are introduced into a conveying pipe and entrained by an upwardly directed gas flow, so that the solids can be discharged at the upper end of the conveying pipe. A customary form of construction provides that the cross section of the conveying pipe is drawn in underneath the solids charging point and widens conically upwards in the form of a venturi. The gaseous conveying medium flows with high velocity through the narrow cross-sectional region, in order to prevent the solids from falling downwards into the gas supply conduit. The high velocities necessary here may lead to erosion or, in the case of sensitive solids, to grain decripitatation. A further disadvantage is that, in spite of the high gas velocity, in the case of relatively large diameters solids fall downwards through the constricted cross-sectional region counter to the direction of gas flow and block the gas supply conduit.

At the same time, the solids are cooled or heated during transport, in dependence on the transporting gas used, usually compressed ambient air, and by the contact with the walls of the reactor. Therefore, a downstream temperature-control stage often has to be provided before the further processing of the solids.

Also known are reactors with a stationary fluidized bed, in which the gas and solid velocities are distinctly lower. However, such reactors are not suitable for transporting solids to great heights.

DESCRIPTION OF THE INVENTION

Therefore, it is the object of the present invention to provide a method for the conveyance of fine-grained solids which allows more gentle transport and at the same time ensures the direct heat transfer between the gas entering and the solids entering.

In accordance with the invention, this object is achieved by a method as mentioned above in which a first gas or gas mixture is introduced from below through a preferably centrally arranged gas supply tube (central tube) into a mixing chamber region of the reactor, the central tube being at least partly surrounded by a stationary annular fluidized bed which is fluidized by supplying fluidizing gas, and in which the gas velocities of the first gas or gas mixture as well as of the fluidizing gas for the annular fluidized bed are adjusted such that the particle Froude numbers in the central tube are between 1 and 100, in the annular fluidized bed between 0.02 and 2 and in the mixing chamber between 0.3 and 30.

With the method in accordance with the invention, the solids can surprisingly be transported very gently over great differences in height, without blockages occurring in the gas supply conduit and without the conveying conduit being subjected to extreme wear. The solids are fluidized in the stationary fluidized bed by supplying the fluidizing gas. When passing through the upper region of the central tube, the first gas or gas mixture entrains solids from the annular stationary fluidized bed, which is referred to as the annular fluidized bed, into the mixing chamber, from which the solids are then conveyed vertically upwards into and through the conveying conduit. By correspondingly adjusting the gas velocities of the first gas or gas mixture and of the fluidizing gas, the solids load of the suspension occurring in the mixing chamber can be varied within wide ranges of up to for example 30 kg of solids per kg of gas. As a result of the reduction of the flow velocity of the first gas or gas mixture after leaving the central tube and/or as a result of the impingement on one of the reactor walls, part of the solids can separate out from the suspension in the mixing chamber and fall back into the stationary annular fluidized bed, while the remaining part of non-precipitated solids is discharged from the mixing chamber together with the first gas or gas mixture. This solids circulation between the annular fluidized bed and the mixing chamber, the high solids loading of the suspension in the mixing chamber and the strong turbulences in the region above the central tube create ideal conditions for the heat transfer between the gas and the solids, so that the temperatures of all the media approximate to within a few degrees Celsius to the theoretical mixing temperature. A further advantage of the method in accordance with the invention lies in the possibility of quickly, easily and reliably adapting the throughput to the requirements by changing the flow velocities of the first gas or gas mixture and of the fluidizing gas.

To ensure particularly effective and at the same time gentle transport of the solids in the reactor, the gas velocities of the first gas mixture and of the fluidizing gas are preferably adjusted for the fluidized bed such that the dimensionless particle Froude numbers ($Fr_p$) are 1.15 to 20, in particular approximately 8, In the central tube, 0.115 to 1.15, in particular approximately 0.15, in the annular fluidized bed, and/or 0.37 to 3.7 in the mixing chamber. The conveying conduit may have a smaller cross section than the mixing chamber, so that the particle Froude number in the conveying conduit is correspondingly higher, but preferably likewise in the range between 0.37 and 3.7. In this case, the particle Froude numbers are each defined by the following equation:

$$Fr_P = \frac{u}{\sqrt{\frac{(\rho_s - \rho_f)}{\rho_f} * d_p * g}}$$

with
 u=effective velocity of the gas flow in m/s
 $\rho_f$=effective density of the fluidizing gas in kg/m³
 $\rho_s$=density of a solid particle in kg/m³
 $d_p$=mean diameter in m of the particles of the fine-grained reactor inventory or the particles forming during operation of the reactor
 g=gravitational constant in m/s².

When using this equation it should be considered that $d_p$ does not indicate the mean diameter (d_50) of the material used, but the mean diameter of the reactor inventory forming during operation, which can differ significantly in both directions from the mean diameter of the material used (primary particles). It is also possible for (secondary) particles with a mean diameter of 20 to 30 μm to be formed during the heat treatment from very fine-grained material with a mean diameter of, for example, 3 to 10 μm. On the other hand, some materials, for example ores, are decrepitated during the heat treatment. In the present invention, solids with a mean secondary grain diameter of approximately 10 μm to 15 mm are referred to as fine-grained material.

In a development of the idea of the invention, it is proposed to adjust the bed height of solids in the reactor, for example by the selection of the gas velocities and the ratio between the solid mass flow and the volumetric flow of the first gas or gas mixture, such that the annular fluidized bed extends beyond the upper orifice end of the central tube in particular by a few millimeters to centimeters, and thus solids are constantly introduced into the jet of the first gas or gas mixture and entrained by the gas stream to the mixing chamber located above the orifice region of the central tube. This achieves particularly good conveyance of the solids in the reactor.

For certain applications, it has turned out to be particularly advantageous if the solids are cooled in the reactor. For example, cement with a temperature of approximately 600° C. may be used as the solids and, before further treatment, be cooled during conveyance in the reactor to below 400° C, in particular to approximately 380° C. Further cooling of the gases supplied to the reactor may also be necessary, independently of the amount of solids supplied, for example if they are to be cleaned in a downstream gas electrostatic precipitator. The cooling of the gases may then be performed in such a way that the solids are not heated up as a result. Similarly, the cooling of the solids may be performed without heating the gas.

Particularly effective cooling of the solids or gases can be achieved in the reactor by the gas mixture and the fluidizing gas introduced via the central tube being air with a temperature below 100° C., in particular of approximately 50° C. In addition, for the further cooling of the solids during the conveyance a liquid cooling medium, for example water, which on contact with the warmer solids evaporates completely into the annular fluidized bed and/or the mixing chamber may be introduced. As a result, the temperatures of the gas or solids can be adjusted in a way corresponding to requirements. It has been found that the liquid cooling medium can be introduced by a tube onto or into the annular fluidized layer, where it evaporates by contact with the warm solids. In some applications it may be required to atomize the cooling medium by means of a one-substance or two-substance nozzle and a gaseous atomizing medium, such as water vapour or compressed air, on introduction into the reactor.

As an alternative to this, for some applications it is required that the solids are heated in the reactor. For example, in the case of the reduction of $Fe_2O_3$ with hydrogen, or the gas reduction of ores containing titanium, material that is dried and pre-heated under an oxidizing atmosphere must be introduced into the reduction stage with as high a temperature as possible. For the briquetting of fine-grained sponge iron into sponge iron briquettes, it is also required to convey the solids to a suitable height without the sponge iron being cooled in the process.

In accordance with an embodiment of the invention, moist, granular solids are dried in the reactor, the heat required for this purpose preferably being supplied by the first gas or gas mixture. This is possible even in the case of solids which cannot be fluidized in the moist state. The moist solids are then immediately surrounded in the annular fluidized bed by already dried, warmer solids, which precipitate from the mixing chamber, so that the moist solids are heated and dried. The solids may then be entrained by the still warmer gas or gas mixture of the central tube, thereby undergoing further heating. In this way, not only surface moisture but also water of crystallization (independently of possible surface moisture) can be extracted from the solids by heating.

For this purpose, it has been found to be advantageous to supply heated gas or gas mixtures, such as for example hydrogen or exhaust gas with a temperature of approximately 900° C., to the reactor through the central tube, into the annular fluidized bed and/or through lances or the like into the mixing chamber. If the first gas or gas mixture or the fluidizing gas of the annular fluidized bed contains oxygen, a fuel, in particular natural gas, can also be additionally supplied to the reactor, in order at least to compensate for the temperature loss due to radiation of the reactor walls and/or due to the gases used for the conveyance by an internal combustion, or in order to achieve heating of the solids above the theoretical mixing temperature. It has turned out to be advantageous in this respect to operate the reactor at a pressure of 0.8 to 10 bar and particularly preferably at atmospheric pressure.

In accordance with the invention, it is possible to charge the reactor with more than just one stream of solids, it also being possible for the different streams of solids to have different temperatures. The reactor then serves at the same time as a mixer, in which a stream of solids of higher temperature can be cooled by a second stream of solids of lower temperature.

It is also possible to connect two or more annular fluidized beds with any desired spacing in parallel or in series, for example for different temperatures.

The method in accordance with the invention is also suitable in particular for at least partly heating and/or calcining solids containing iron oxide in at least one pre-heating stage and reducing them in a downstream reduction stage, the solids being transported from the at least one pre-heating stage into the downstream reduction stage by means of the reactor serving as a flash heater and thereby being heated for example by internal combustion of natural gas.

In order to improve the energy utilization, it is preferred that the exhaust gases from the reactor are passed to the at least one pre-heating stage, which in the case of ores which require a long retention time may have a reactor with a circulating fluidized bed or in the case of ores which require a short retention time may have a venturi pre-heater. In this way, a fuel can be supplied just to the reactor serving as a flash heater, while the pre-heating stage(s) are operated substantially with the waste heat of the reactor. In comparison with the known methods, in which the pre-heated solids are transported into the reduction stage with in some cases considerable heat loss, for example by means of a bucket elevator, the solids can even be heated still further during conveyance if the reactor is used as a flash heater. The higher temperature of the solids introduced into the reduction stage(s) has the effect that operation of the pre-reduction stage is simplified distinctly.

In accordance with a preferred embodiment, the actual outlet temperature of the solids on leaving the reactor is measured. In dependence on the measured actual outlet temperature in relation to a set point outlet temperature, the supply of cold or heated gases or gas mixtures, to an in particular liquid cooling medium and/or fuels, can be varied. The optimum temperature for the further processing of the solids can in this way be regulated quickly and reliably while operation is in progress.

A plant in accordance with the invention, which is in particular suited for performing the method described above, has a reactor constituting a fluidized bed reactor for the conveyance of solids, the reactor having a gas supply system which is formed such that gas flowing through the gas supply system entrains solids from a stationary annular fluidized bed, which at least partly surrounds the gas supply system, into the mixing chamber. Preferably, this gas supply system extends into the mixing chamber. It is, however, also possible to let the gas supply system end below the surface of the annular fluidized bed. The gas is then introduced into the annular fluidized bed for example via lateral apertures, entraining solids from the annular fluidized bed into the mixing chamber due to its flow velocity.

In accordance with a preferred aspect of the invention, the gas supply system has a central tube extending upwards substantially vertically from the lower region of the reactor, which is at least partly surrounded in an annular manner by a chamber in which the stationary annular fluidized bed is formed. The annular fluidized bed does not have to be annular, but rather other forms of the annular fluidized bed are also possible, in dependence on the geometry of the central tube and the reactor, as long as the central tube is at least partly surrounded by the annular fluidized bed.

Of course, two or more central tubes, which may all have different or identical dimensions and shapes, may also be provided in the reactor, it being preferred if at least one of the number of central tubes is arranged approximately centrally with reference to the cross-sectional area of the reactor.

Separation of the solids from the gas or gas mixture used for the conveyance is made possible before further processing if a separator is provided downstream of the reactor. For this purpose, a cyclone, a hot-gas electrostatic precipitator, a bag filter or the like can be used for example.

To provide for a reliable fluidization of the solids and the formation of a stationary fluidized bed, provided in the annular chamber of the reactor is a gas distributor which divides the chamber into an upper fluidized bed region and a lower gas distributor chamber. The gas distributor chamber is connected to a supply conduit for fluidizing gas. Instead of the gas distributor chamber, a gas distributor composed of tubes may also be used.

For adjusting the temperatures necessary for the further processing of the solids or the gas, the reactor may have a supply conduit for fuel or a suitable liquid cooling medium, such as water, leading to the central tube, such a supply conduit leading to the annular chamber and/or such a supply conduit, leading to the mixing chamber.

In the annular fluidized bed and/or the mixing chamber of the reactor, means for deflecting the solids and/or fluid flows may be provided in accordance with the invention. It is for instance possible to position an annular weir, whose diameter lies between that of the central tube and that of the reactor wall, in the annular fluidized bed such that the upper edge of the weir protrudes beyond the solids level obtained during operation, whereas the lower edge of the weir is arranged at a distance from the gas distributor or the like. Thus, solids raining out of the mixing chamber in the vicinity of the reactor wall must first pass by the weir at the lower edge thereof, before they can be entrained by the gas flow of the central tube back into the mixing chamber. In this way, an exchange of solids is enforced in the annular fluidized bed, so that a more uniform retention time of the solids in the annular fluidized bed is obtained.

Developments, advantages and application possibilities of the invention also emerge from the following description of exemplary embodiments and the drawing. All features described and/or illustrated in the drawing form the subject-matter of the invention per se or in any combination, independently of their inclusion in the claims or their back-reference.

BRIEF DESCRIPTION OF THE DRAWINGS

The single FIGURE shows a process diagram of a method and a plant in accordance with an exemplary embodiment of the present invention.

DETAILED DESCRIPTION OF THE PREFERRED EMBODIMENT

In the method shown in the FIGURE, which is in particular suited for the conveyance of fine-grained solids, solids are introduced into a reactor 1 via a supply conduit 2. The reactor 1, which is cylindrical for example, has a central tube 3, which is arranged approximately coaxially with the longitudinal axis of the said reactor and extends substantially vertically upwards from the bottom of the reactor 1.

Provided in the region of the bottom of the reactor 1 is an annular gas distributor chamber 4, which is closed off at the top by a gas distributor 5 having apertures. A supply conduit 6 opens out into the gas distributor chamber 4.

Arranged in the vertically upper region of the reactor 1, which forms a fluidized bed chamber 7 and a conveying conduit 13 adjoining the latter, is an outlet conduit 8, which opens out into a separator 9 formed in the FIGURE as a cyclone. The conveying conduit 13 may have a reduced cross section in comparison with the mixing chamber 7 and is possibly distinctly longer than the mixing chamber 7.

If solids are then introduced into the reactor 1 via the supply conduit 2, a layer annularly surrounding the central tube 3, which is referred to as an annular fluidized bed 10, forms on the gas distributor 5. Fluidizing gas introduced into the gas distributor chamber 4 through the supply conduit 6 flows through the gas distributor 5 and fluidizes the annular fluidized bed 10, so that a stationary fluidized bed is formed. The velocity of the gases supplied to the reactor 1 is then adjusted such that the particle Froude number in the annular fluidized bed 10 is approximately 0.15 and in the mixing chamber 7 and the conveying conduit 13 is approximately 1.8 or approximately 3.

By supplying further solids into the annular fluidized bed 10, the level of the solids 11 in the reactor 1 increases to the extent that solids enter the orifice of the central tube 3. At the same time, a gas or gas mixture is introduced into the reactor 1 through the central tube 3. The velocity of the gas supplied to the reactor 1 is preferably adjusted such that the particle Froude number in the central tube 3 is approximately 8. Due to these high gas velocities, the gas flowing through the central tube entrains solids from the stationary annular fluidized bed 10 into the mixing chamber 7 when passing through the upper orifice region.

Due to the banking of the level 11 of the annular fluidized bed 10 as compared to the upper edge of the central tube 3, solids flow over this edge into the central tube 3, whereby an intensively mixed suspension is formed. The upper edge of the central tube 3 may be straight, corrugated or indented or the central tube 3 may have lateral inlet apertures. As a result of the reduction of the flow velocity by the expansion of the gas jet and/or by impingement on one of the reactor walls, the entrained solids quickly lose speed and partly fall back again into the annular fluidized bed 10. The amount of unprecipitated solids is discharged from the reactor 1 together with the gas stream via the conveying conduit 13 and the conduit 8.

Between the reactor regions of the stationary annular fluidized bed 10 and the mixing chamber 7 there is thereby obtained a solids circulation which ensures a good heat transfer. Before farther processing, the solids discharged via the conduit 8 are separated from the gases or gas mixtures in the cyclone 9.

For heating the solids conveyed in the reactor 1, the gases or gas mixtures passed to the central tube 3 and/or the gas distributor chamber 4 may be preheated. In addition, a fuel may be supplied into the central tube 3, into the gas distributor chamber 4 and/or via a lance arrangement or the like, as indicated in the FIGURE by reference numeral 12, into the annular fluidized bed 10 or the mixing chamber 7 and, by internal combustion in the reactor 1, allows uniform heating of the solids without local temperature peaks.

Alternatively, for cooling the solids conveyed in the reactor 1, cold gases or gas mixtures may be supplied to the central tube 3 and/or the gas distributor chamber 4. The term "cold" is to be understood in this respect as meaning in relation to the temperature of the solids, the intention being to achieve the desired cooling effect. In addition, a cooling medium, such as water or the like, may be supplied into the central tube 3, into the gas distributor chamber 4 and/or via the lance arrangement 12 or the like and further reduces the temperature of the solids conveyed in the reactor 1.

The temperature of the solids leaving the reactor 1 can be deliberately varied by a regulating device. For this purpose, the actual outlet temperature of the solids is measured, for example in the conduit 8, and the supply of fuel or cooling medium into the reactor 1 is then controlled in dependence on an adjustable set point outlet temperature.

The invention will be described below with reference to three examples demonstrating the inventive idea, but not restricting the same.

EXAMPLE 1

Conveyance of $Fe_2O_3$ or Titanium-containing Ores with Heat Transfer Under Oxidizing Conditions In a plant corresponding to the FIGURE, 65.7 t/h of $Fe_2O_3$ with a temperature of 985° C. were supplied to the reactor for conveyance and possibly drying under an oxidizing atmosphere. Furthermore, the reactor 1 was supplied via conduit 6 with 1000 $Nm^3/h$ of air and via the central tube 3 with 12,300 $Nm^3/h$ of air with a temperature of 50° C. as a transporting medium, to which 532 $Nm^3/h$ of natural gas had been admixed as a fuel in the central tube 3 directly before entry into the annular fluidized bed 10. 65.7 t/h of $Fe_2O_3$ with a temperature of 1000° C. were removed from the reactor via conduit 8.

The fluidic conditions in the mixing chamber 7 with a particle Froude number of approximately 3 allowed an internal combustion of the natural gas without temperature peaks. In this way, instead of a temperature loss in the reactor 1 due to radiation of the reactor walls and the mixing of the solids with cold transporting air, even an increase in the temperature of the solids by 15° C. was achieved in the conduit 8.

As a result, it was possible to keep the temperature of the reducing gases used for the fluidizing of the solids in a downstream reduction stage below the critical limit for technical feasibility of 1000° C. The solids were in this case conveyed in the reactor 1 to a height of approximately 46 m.

In the same way, a conveyance of ores containing titanium was possible with simultaneous drying under oxidizing conditions. In this case, natural gas was additionally introduced into the reactor 1 for internal combustion via a lance arrangement 12 above the annular fluidized bed 10, i.e. directly into the mixing chamber 7.

The gas velocities were in this case selected such that the particle Froude numbers in the annular fluidized bed 10 were approximately 0.15 and in the central tube 3 approximately 8.

EXAMPLE 2

Conveyance and Heating of Sponge Iron

In a plant corresponding to the FIGURE, 68 t/h of fine-grained sponge iron with a temperature of approximately 650° C. were supplied to the reactor 1 via the supply conduit 2.

40,000 $Nm^3/h$ of hydrogen with a temperature of 900° C. were supplied to the reactor 1 via the central tube 3 from an upstream reduction stage for iron ore and a further 750 $Nm^3/h$ of hydrogen with ambient temperature were supplied to the reactor 1 via the gas distributor chamber 4. The gas velocities were in this case selected such that the particle Froude numbers in the annular fluidized bed 10 were approximately 0.15, in the mixing chamber 7 approximately 1.8 and in the central tube 3 approximately 8.

In this way it was possible for fine-grained sponge iron to be conveyed in the reactor 1 to a height of approximately 50 m and at the same time be heated to the temperature required for the downstream briquetting in presses to form sponge iron briquettes.

EXAMPLE 3

Conveyance and Cooling of Cement

In a plant corresponding to the FIGURE, 68 t/h of fine-grained cement with a temperature of approximately 600° C. were supplied to the reactor 1 via the supply conduit 2.

Furthermore, 6,250 $Nm^3/h$ of air were supplied to the reactor 1 via the central tube 3 as a conveying medium and 750 $Nm^3/h$ of air were supplied to the reactor 1 via the gas distributor chamber 4 for fluidizing, respectively with a temperature of 50° C. The gas velocities were in this case selected such that the particle Froude numbers in the annular fluidized bed 10 were approximately 0.15, in the mixing chamber 7 approximately 1.8 and in the central tube 3 approximately 8. A temperature of 510° C. was established in the conveying line.

In addition, 2600 kg/h of water with a temperature of approximately 20° C. were supplied to the reactor 1 via the lance arrangement 12. In this way it was possible to achieve the temperature of the cement desired for the downstream dedusting in a hot-gas electrostatic precipitator of 380° C. at the end of the conveying line, i.e. in the conduit 8.

LIST OF REFERENCE NUMERALS 1 reactor
2 supply conduit for solids
3 central tube (gas supply tube)
4 gas distributor chamber
5 gas distributor
6 supply conduit for fluidizing gas
7 mixing chamber
8 conduit
9 separator (cyclone)
10 (stationary) annular fluidized bed
11 level of the annular fluidized bed 10

12 lance arrangement
13 conveying conduit

The invention claimed is:

1. A method for the conveyance of fine-grained solids in a fluidized bed reactor, comprising:

introducing a first gas or gas mixture from below through a gas supply tube into a mixing chamber of the reactor such that the gas flowing through the gas supply tube entrains solids from a stationary annular fluidized bed that at least partly surrounds the gas supply tube, wherein the bed height of the solids in the reactor are adjusted such that the annular fluidized bed extends beyond an upper orifice end of the gas supply tube and that solids are constantly introduced into the first gas or gas mixture and entrained by the gas stream to the mixing chamber located above the orifice region of the gas supply tube;

fluidizing the annular fluidized bed by supplying a fluidizing gas; and conveying the solids entrained in the gas out of the reactor by adjusting the gas velocities of the first gas or gas mixture as well as of the fluidizing gas for the annular fluidized bed such that the particle Froude numbers in the gas supply tube are between 1 and 100, in the annular fluidized bed between 0.02 and 2 and in the mixing chamber between 0.3 and 30.

2. The method as claimed in claim 1, wherein the particle Froude number in the gas supply tube is between 1.15 and 20.

3. The method as claimed in claim 1, wherein the particle Froude number in the annular fluidized bed is between 0.115 and 1.15.

4. The method as claimed in claim 1, wherein the particle Froude number in the mixing chamber is between 0.37 and 3.7.

5. The method as claimed in claim 1, wherein heated solids are cooled in the reactor during the conveyance.

6. The method as claimed in claim 5, wherein the gas mixture introduced via the gas supply tube and/or the fluidizing gas is air with a temperature below 100° C.

7. The method as claimed in claim 5, wherein a cooling medium is introduced into the annular fluidized bed and/or the mixing chamber.

8. The method as claimed in claim 1, wherein the first gas or gas mixture introduced into the reactor is cooled without heating the solids in the process.

9. The method as claimed in claim 1, wherein the solids are heated in the reactor.

10. The method as claimed in claim 9, wherein solids containing titanium-containing ores, iron oxide or further metal oxides are used as the solids.

11. The method as claimed in claim 9, wherein heated gas is supplied to the reactor through the gas supply tube, into the annular fluidized bed and/or through lances or the like into the mixing chamber.

12. The method as claimed in claim 9, wherein a fuel is supplied to the reactor through the gas supply tube, into the annular fluidized bed and/or through lances or the like into the mixing chamber, and that the pressure in the reactor is between 0.8 and 10 bar.

13. The method as claimed in claim 9, wherein solids containing iron oxide are at least partly heated and/or calcined in at least one pre-heating stage and reduced in a downstream reduction stage, the solids being transported from the at least one pre-heating stage into the downstream reduction stage by means of the reactor serving as a flash heater.

14. The method as claimed in claim 13, wherein the exhaust gases from the reactor are passed to the at least one pre-heating stage, which has a reactor with a circulating fluidized bed and/or a venturi pre-heater.

15. The method as claimed in claim 13, wherein a fuel is supplied to the reactor serving as a flash heater and the pre-heating stage(s) are operated substantially with the waste heat of the reactor.

16. The method as claimed in claim 13, wherein the actual outlet temperature of the solids from the reactor is measured and that, in dependence on the measured actual outlet temperature in relation to a set point outlet temperature, the supply of cold or heated gases or gas mixtures, a cooling medium and/or fuels, is varied.

17. A plant for the conveyance of fine-grained solids, in particular for performing a method as claimed in claim 1, comprising a reactor constituting a fluidized bed reactor, wherein the reactor has a gas supply system which is formed such that gas flowing through the gas supply system entrains solids from a stationary annular fluidized bed, which at least partly surrounds the gas supply system, into the mixing chamber, an external separator for separating the solids downstream of the reactor, and a conveying conduit connecting the mixing chamber with the external separator.

18. The plant as claimed in claim 17, wherein the gas supply system has at least one gas supply tube extending upwards substantially vertically from the lower region of the reactor into the mixing chamber of the reactor, the gas supply tube being at least partly surrounded by an annular chamber in which the stationary annular fluidized bed is formed.

19. The plant as claimed in claim 18, wherein the gas supply tube is arranged approximately centrally with reference to the cross-sectional area of the reactor.

20. The plant as claimed in claim 18, wherein provided in the annular chamber of the reactor is a gas distributor which divides the chamber into an upper fluidized bed region and a lower gas distributor chamber, and that the gas distributor chamber is connected to a supply conduit for fluidizing gas.

21. The plant as claimed in claim 18, wherein the reactor has at least one supply conduit for fuel and/or a cooling medium leading to the gas supply tube and/or at least one such supply conduit leading to the annular chamber.

22. The plant as claimed in claim 17, wherein the external separator is a cyclone, a hot-gas electrostatic precipitator, or a bag filter.

* * * * *